United States Patent [19]
Mizuno et al.

[11] Patent Number: 5,130,972
[45] Date of Patent: Jul. 14, 1992

[54] OPTICAL RECORDING AND REPRODUCING APPARATUS

[75] Inventors: Osamu Mizuno, Osaka; Masanari Mouri; Tohru Nakamura, both of Katano, all of Japan

[73] Assignee: Matsushita Electric Industrial Co., Ltd., Osaka, Japan

[21] Appl. No.: 546,757

[22] Filed: Jul. 2, 1990

[30] Foreign Application Priority Data

Jul. 6, 1989 [JP] Japan .................. 1-174704

[51] Int. Cl.$^5$ .................. G11B 17/30; G11B 21/02
[52] U.S. Cl. .................. 369/215; 369/219; 369/244; 360/104
[58] Field of Search .................. 369/215, 219, 220, 244; 360/104, 105, 106

[56] References Cited

U.S. PATENT DOCUMENTS

| | | | |
|---|---|---|---|
| 4,427,905 | 1/1984 | Sutton .................. | 360/106 |
| 4,441,130 | 4/1984 | Boehm et al. .................. | 360/106 |
| 4,613,962 | 9/1986 | Inoue et al. .................. | 369/219 |
| 4,740,946 | 4/1988 | Yumura et al. .................. | 369/219 |
| 4,812,934 | 3/1989 | Suzuki et al. .................. | 360/104 X |
| 4,825,432 | 4/1989 | Takahashi .................. | 369/219 X |
| 4,862,441 | 8/1989 | Yumura et al. .................. | 369/220 X |

FOREIGN PATENT DOCUMENTS

| | | |
|---|---|---|
| 0210781 | 2/1987 | European Pat. Off. . |
| 0350225 | 1/1990 | European Pat. Off. . |
| 61-168137 | 7/1986 | Japan . |
| 62-109267 | 5/1987 | Japan . |
| 0293724 | 11/1988 | Japan .................. 369/215 |
| 173571 | 3/1989 | Japan . |

*Primary Examiner*—Stuart S. Levy
*Assistant Examiner*—Tien Ba Pham
*Attorney, Agent, or Firm*—Stevens, Davis, Miller & Mosher

[57] ABSTRACT

An optical recording and reproducing apparatus includes a movable portion carrying a movable optical system, a sliding member slidable on a guide shaft, and a rotation limiting device engaged with an auxiliary guide shaft so as to limit the rotation of the sliding member. In order to reduce the friction of the sliding member, the center of gravity of the movable portion is disposed in the vicinity of the axis of the guide shaft. Further, the construction is such that a thrust moment produced by a drive device and acting around the center of gravity of the movable portion is reduced to substantially zero.

8 Claims, 7 Drawing Sheets

OPTICAL RECORDING AND REPRODUCING APPARATUS

BACKGROUND OF THE INVENTION

1. Field of the Invention

This invention relates to an optical recording and reproducing apparatus, such as a magneto-optical recording and reproducing apparatus used, for example, as an external memory device for an electronic computer or a device for recording and reproducing audio and visual signals and other information.

2. Prior Art

With the recent development of electronic computers and high-speed mass information transfer means, there has been a demand for a non-volatile memory device which is inexpensive, having a high density and a large capacity, and which is capable of high-speed transfer. For this reason, in many cases, magnetic disk devices have been used. However, such a magnetic disk device has problems such as a low recording density, a high cost per unit information, and limited environments of use of the magnetic disk device. Optical recording has now been spotlighted as a technology for overcoming such problems.

Generally, in an optical recording and re-producing apparatus, a movable optical system including an objective lens is moved along a guide shaft extending radially of a recording medium so as to achieve access to data. Generally, to achieve a cost reduction, guide means for supporting the movable optical system in a manner to allow the movement of this optical system in a direction parallel to the guide shaft is constituted by a cylindrical sliding member mounted around the guide shaft. The movable optical system is fixedly secured to the outer peripheral surface of the sliding member. Since the sliding member is slidable relative to the guide shaft, the movable optical system is movable along the length of the guide shaft. However, this sliding support means allows unnecessary rotation of the movable optical system about the guide shaft, in addition to a translational motion of the movable optical system along the guide shaft. Therefore, it is necessary to provide means for limiting such rotation. Such rotation limiting means comprises an auxiliary guide shaft extending parallel to the guide shaft, and a rolling member mounted on the movable optical system and held in rolling contact with the auxiliary guide shaft. Thus, in the support means of the general type used in the conventional optical recording and reproducing apparatus, the guide shaft supports the movable optical system in a manner to allow a sliding movement of the same, and the auxiliary guide shafts support the movable optical system through the rolling contact.

That is, a guide means for a movable optical system in an optical recording and reproducing apparatus has in general a guide shaft for slidably supporting the movable optical system and an auxiliary guide shaft for supporting the same in a rolling contact manner.

Generally, with respect to the thrust applied at the time of the access operation, a thrust vector passes through the center of gravity of the movable optical system. For example, if drive coils are provided respectively on the opposite sides of the movable optical system and outside of the guide shaft, the resultant thrust vector due to the drive coils can be designed to pass through the center of gravity of the movable optical system. This arrangement can present the generation of a moment due to the inertia force acting on the movable optical system during the access acceleration.

However, with such conventional arrangement, the following problems are encountered. Namely, during the operation, the sliding member is subjected to a friction force, and when the line of action of the friction force is not in alignment with the line of action of the thrust, a moment is produced. This moment is received by the sliding member, and a reaction moment is produced. The resulting reaction force also develops in the sliding member. In other words, during the movement of the movable optical system, the sliding member is subjected to a large friction force, so that acceleration characteristics of the movable optical system are greatly deteriorated. Further, the reliability of the sliding member which is likely to wear is adversely affected greatly.

Further, various forces are produced due to disturbances, and therefore vibrations are produced because of a small clearance between the sliding member and the guide shaft, so that the controllability of the movable optical system is adversely affected greatly. Particularly when disturbance develops in a direction perpendicular to a plane including the axes of the guide shaft and the auxiliary guide shaft, the inertia force appearing at the center of gravity of the movable optical system produces a moment about the sliding member. The reaction moment against this moment acts as a reaction force on the rolling member (rotation limiting member) on the auxiliary guide shaft. When acceleration disturbance of a large magnitude, such as an impact, develops, this reaction force may exceed the withstanding strength of the rolling member, which lowers the reliability. In other words, the guide structure for the movable optical system of the above conventional optical recording and reproducing apparatus can be quite easily affected by the disturbances.

SUMMARY OF THE INVENTION

It is an object of this invention to provide an optical recording and reproducing apparatus, in which a guide means for guiding an optical movable system during an operation thereof does not produce any forces in directions other than the guiding direction, and achieves excellent acceleration characteristics and controllability.

According to the present invention, there is provided an optical recording and reproducing apparatus comprising:

a movable portion having a movable optical system including an objective lens for converging a light beam onto a recording surface of a disk-shaped recording medium;

drive means for applying to the movable portion a thrust acting substantially in a radial direction of the disk-shaped recording medium;

a base;

a guide shaft fixedly mounted on the base and extending in a direction parallel to the direction of the thrust;

guide means supporting the movable portion in such a manner that the movable portion is movable in the direction of an axis of the guide shaft, the guide means including a contact portion making contact with the guide shaft, and the center of the contact portion having a center portion which is disposed in the vicinity of the axis of the guide shaft; and rotation limiting means for limiting the rotation of the movable portion relative to the guide shaft about the axis of the guide shaft;

the movable portion being moved by the drive means relative to the guide shaft substantially in the radial direction of the disk-shaped recording medium, the center of gravity of the movable portion being disposed in the vicinity of the axis of the guide shaft, the drive means applying the thrust in such a manner that a moment produced by the thrust and acting around the center of gravity of the movable portion is rendered to substantially zero.

With this construction, during the movement of the movable portion, the direction of the inertia force acting on the center of gravity of the movable portion, as well as the direction of the vector of the friction force acting on the guide means, coincides with the direction of the thrust vector, so that except for the gravity, no force other than the force acting in the direction of the thrust vector is applied on the guide means. Therefore, the friction force between the guide means and the guide shaft is reduced, thereby improving acceleration characteristics and the controllability. Further, since the center of gravity of the movable portion is disposed at the center of the contact portion of the guide means, a quite stable operation is ensured even when disturbance is applied. Therefore, according to the present invention, there can be provided the optical recording and reproducing apparatus which is quite suited for high-speed access.

BRIEF DESCRIPTION OF THE DRAWINGS

FIG. 2b is a right side-elevational view of the rotation limiting means of FIG. 2a;

FIG. 3b is a right side-elevational view of the rotation limiting means of FIG. 3a.

DESCRIPTION OF THE PREFERRED EMBODIMENTS OF THE INVENTION

Figure 1A:
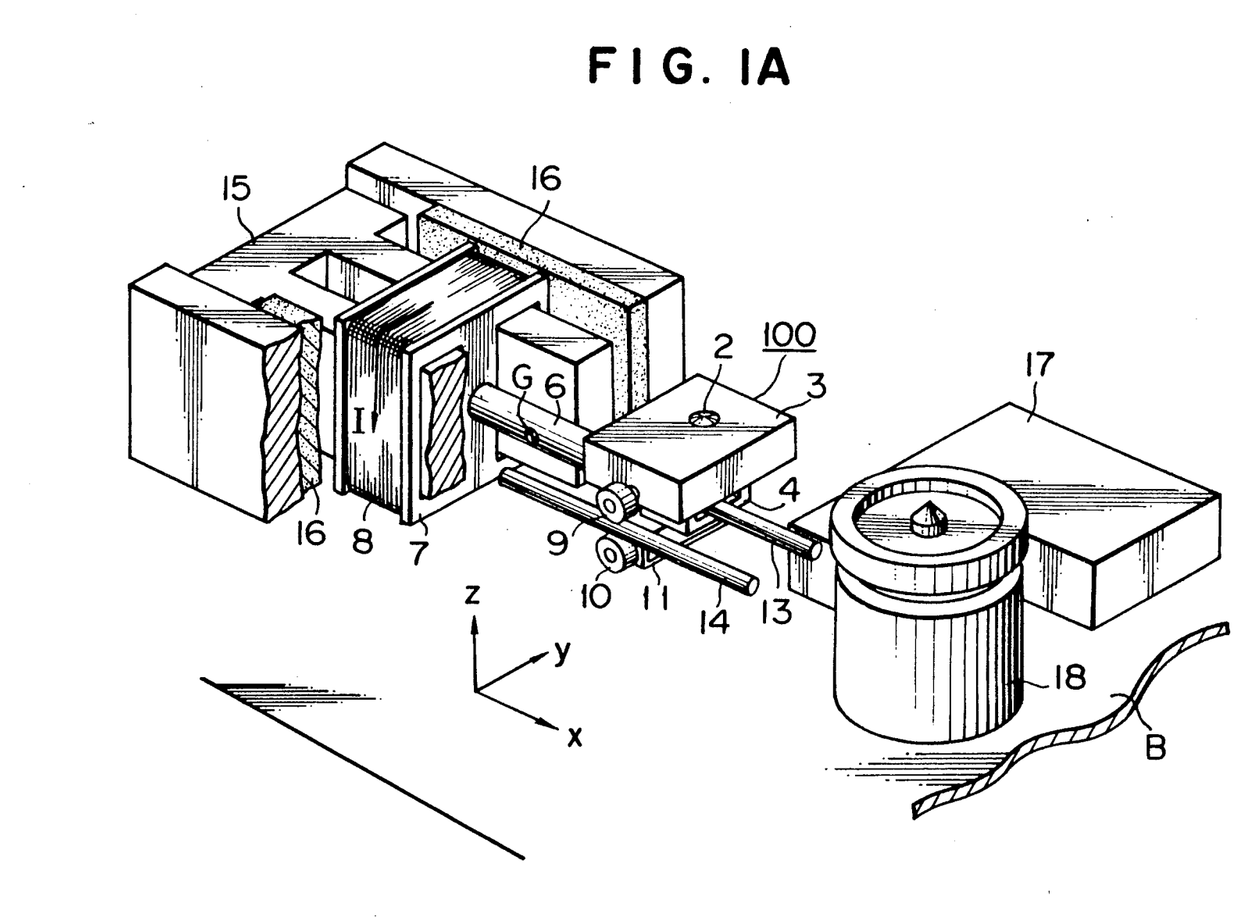
FIG. 1a is a perspective view of an optical recording and reproducing apparatus in a first embodiment form of the present invention.
Figure 1B:
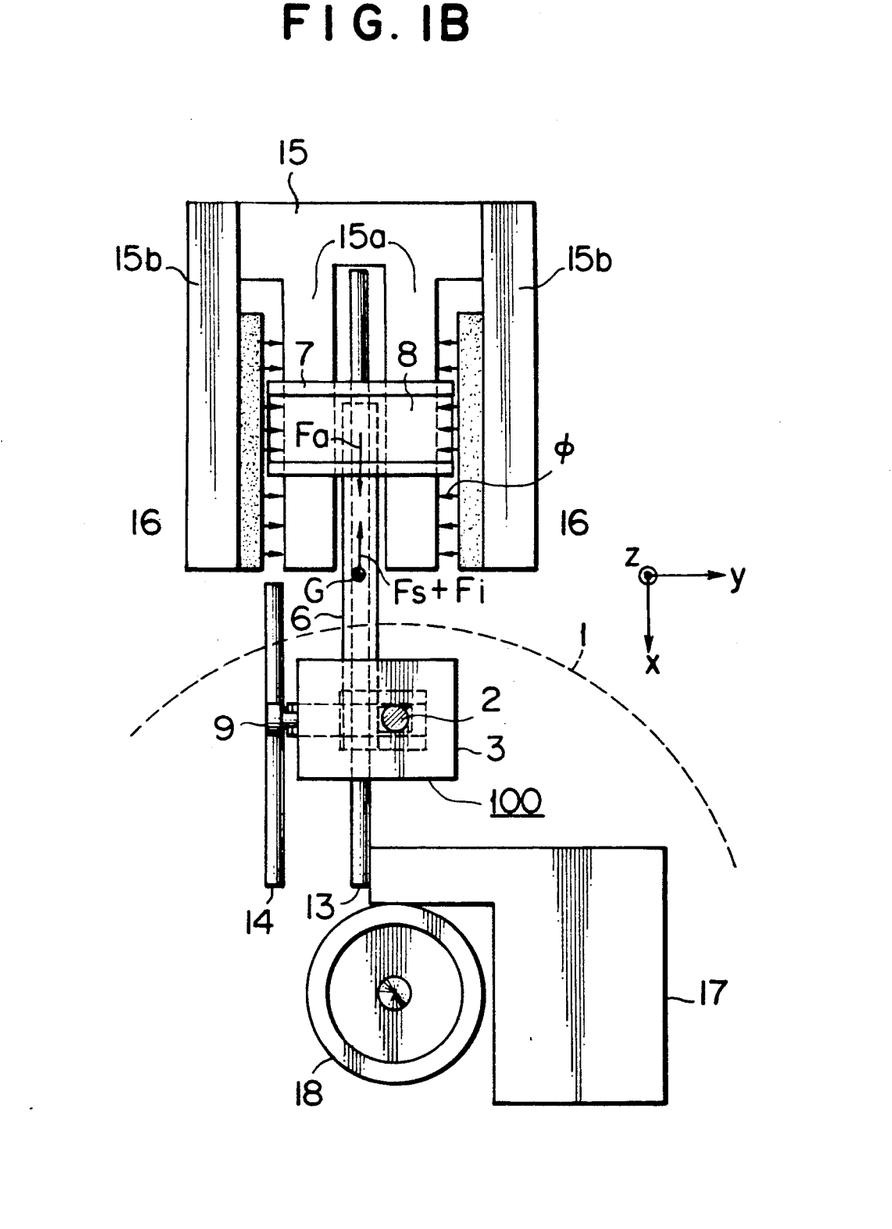
FIG. 1b is a plan view of the optical recording and reproducing apparatus.
Figure 1C:
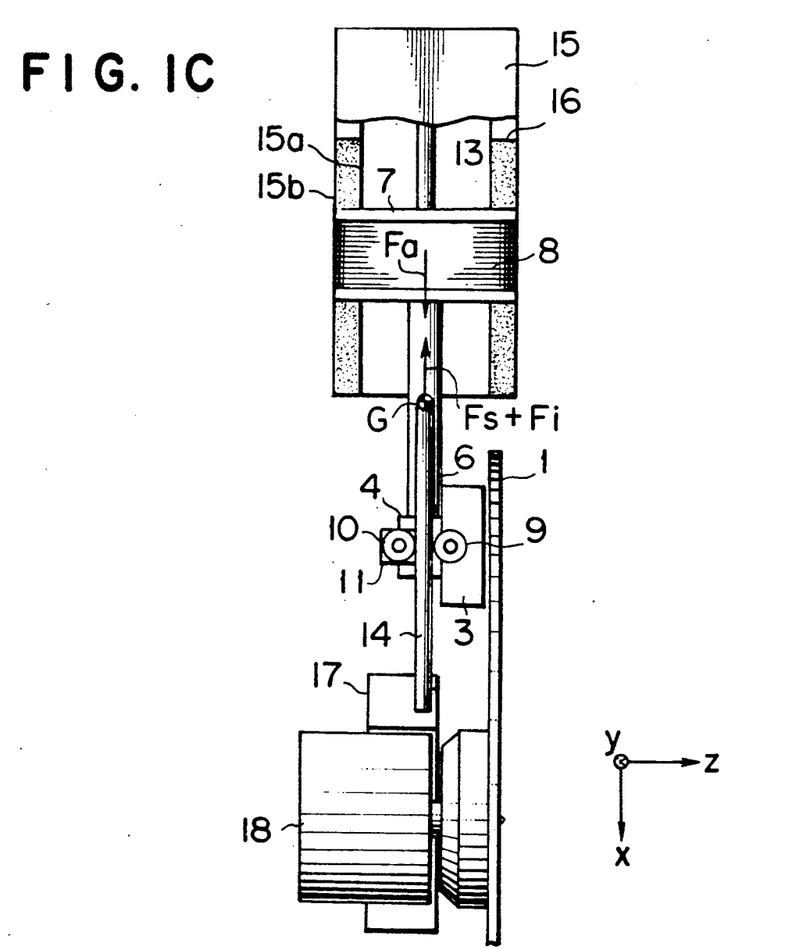
FIG. 1c is a right side-elevational view of the optical recording and reproducing apparatus.
Figure 1D:
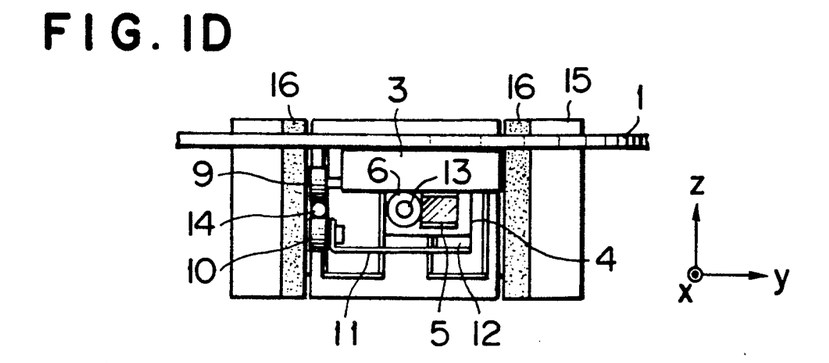
FIG. 1d is a front-elevational view of the optical recording/and reproducing apparatus.
Figure 1E:
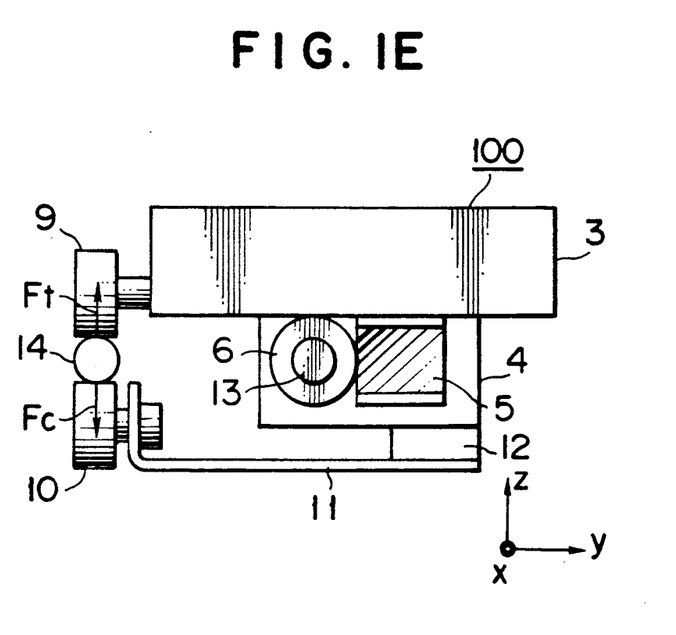
FIG. 1e is a detailed front-elevational view of a portion of the optical recording and reproducing apparatus.
Figure 1F:
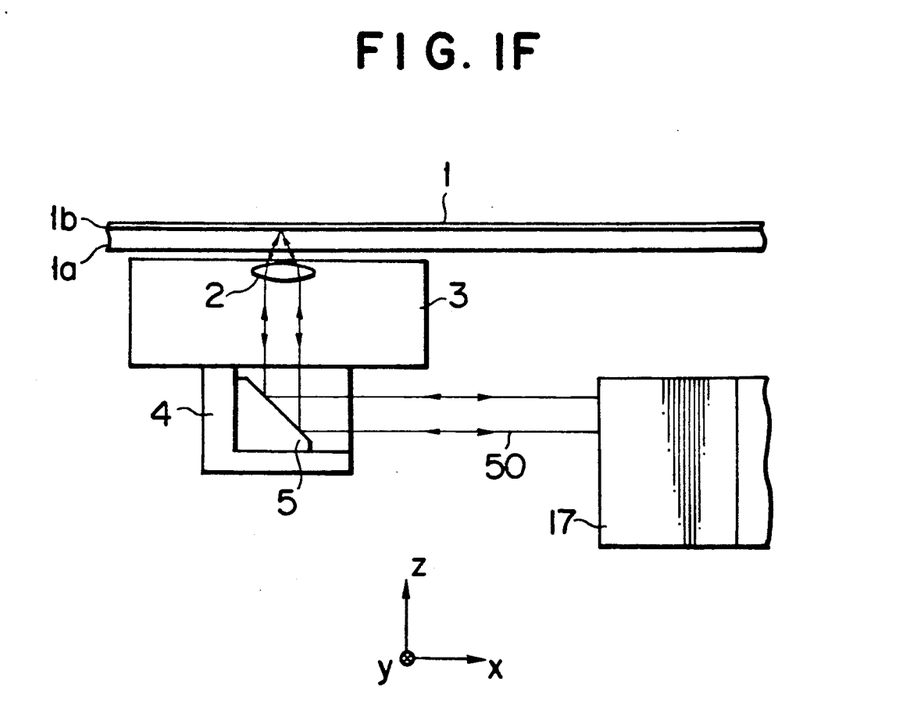
FIG. 1f is a detailed right side-elevational view of a portion of the optical recording and reproducing apparatus.

A first embodiment of the present invention will now be described with reference to the drawings. FIGS. 1a to 1f show an optical recording and reproducing apparatus according to the first embodiment of the invention. FIG. 1a is a perspective view of this apparatus, and x, y and z in this Figure denote the directions of the coordinate axes, respectively. For the sake of convenience, a view as seen from the positive side to the negative side of the z-axis is a plan view, and a view as seen from the positive side to the negative side of the x-axis is a front-elevational view, and a view as seen from the positive side to the negative side of the y-axis is a left side-elevational view, and a view as seen from the negative side to the positive side of the y-axis is a right side-elevational view. Also, the positive direction of the z-axis is referred to as "upper direction", and the negative direction of the z-axis is referred to as "lower direction". FIGS. 1b, 1c and 1d are the plan view, the right side-elevational view and the front-elevational view, respectively. FIG. 1e is a detailed front-elevational view of a portion of the recording and reproducing apparatus, and FIG. 1f is a detailed right side-elevational view of a portion of the apparatus.

A recording medium 1 (omitted in FIGS. 1a and 1e) has a disk-shape, and has a spiral recording track formed on its one side or a face directed in the negative direction of the z-axis, the recording medium 1 being disposed in a plane x-y. As shown in FIG. 1f, the recording medium 1 comprises at least a substrate 1a made of a transparent resin, such as polycarbonate, and a recording surface 1b defined by an information-recording film. An objective lens 2 focuses a laser beam (which is directed toward the positive direction of the z-axis) on the recording surface 1b to form thereon a light spot for recording, reproduction or erasure of the information. A fixed optical system 17 (omitted in FIGS. 1d and 1e) is fixedly mounted on a base (not shown), and comprises at least a laser beam source, and emits a laser beam 50 of parallel rays in the negative direction of the x-axis, as shown in FIG. 1e. A mirror 5 of a generally triangular prism-shape changes the direction of the laser beam 50 to a direction parallel to the z-axis, through a mirror reflection. An objective lens actuator 3 moves the objective lens 2 in the direction of the z-axis so as to control the focusing condition of the laser beam. A mirror holder 4 holds the mirror 5 below the objective lens actuator 3. The objective lens 2, the objective lens actuator 3, the mirror holder 4 and the mirror 5 constitute in combination a movable optical system 100. A drive coil 8 comprises a wire-like conductor wound around a bobbin 7 of a non-magnetic material to form a plurality of turns of the conductor, the axis of winding of the drive coil 8 being parallel to the x-axis. A first guide shaft 13 of a cylindrical shape is fixedly mounted on the base (not shown), and extends parallel to the x-axis. A sliding member 6 of a hollow cylindrical shape is fitted on the first guide shaft 13 with a slight gap therebetween, and the sliding member 6 has a sliding layer formed at its inner surface disposed in contact with the first guide shaft 13, the sliding layer being made of a lubricating material such as Teflon. The sliding member 6 is smoothly slidable relative to the first guide shaft 13 in a direction parallel to the x-axis. As shown in FIG. 1b, the sliding member 6 is press-fitted at one end portion in the movable optical system 100, and the other end portion of the sliding member 6 is press-fitted in the bobbin 7 at the axis of winding of the drive coil 8. A second guide shaft 14 of a cylindrical shape is fixedly mounted on the base (not shown), and is disposed parallel to the first guide shaft 13. The axis of the second guide shaft 14 disposed in a plane which passes through the axis of the first guide shaft 13 and is parallel to the plane x-y. A first wheel 9 has a rotation shaft parallel to the y-axis, as best shown in FIG. 1e, and this rotation shaft is rigidly mounted on the objective lens actuator 3 of the movable optical system 100. The first wheel 9 can roll on and along the outer peripheral surface of the second guide shaft 14. A second wheel 10 is in contact with the second guide shaft 14, and the point of contact of the second wheel 10 with the second guide shaft 14 is disposed on a plane which is perpendicular to the x-axis and passes through the point of contact of the first wheel 9 with the second guide shaft 14. A rotation shaft of the second wheel 10 is parallel to the rotation shaft of the first wheel 9, and the second wheel 10 can roll on and along the second guide shaft 14. A leaf spring 11 is rigidly mounted at one end on the mirror holder 4 of the movable optical system 100 via a spacer 12, and the second wheel 10 is mounted on the other end of the leaf spring 11 which is bent. In the condition in which the second wheel 10 is held against the second guide shaft 14, the leaf spring 11 is elastically deformed substantially in the negative direction of the z-axis.

A drive magnetic yoke 15 (omitted in FIG. 1e) made of a soft magnetic material is symmetrical with respect to a plane which is parallel to the plane x-z and passes through the axis of the first guide shaft 13, as shown in FIG. 1b. The first guide shaft 13 is thus disposed on this symmetrical plane, and the drive magnetic yoke 15 includes a pair of inner yokes 15a which are disposed respectively on the opposite sides of the symmetrical plane and passe through the drive coil 8. The drive magnetic yoke also includes a pair of outer yokes 15b disposed outside of the drive coil 8 to cover the same. The inner yokes 15a and the outer yokes 15b are magnetically connected together at one end of the drive magnetic yoke 15 on the negative side of the x-axis. The outer yokes 15b are fixedly secured to the base (not shown). Drive magnets 16 (omitted in FIG. 1e) are fixedly secured respectively to the inner surfaces of the outer yokes 15b facing the drive coil 8, and each of the drive magnets 16 is magnetized in a direction parallel to the y-axis (FIG. 1b), that is, toward the drive coil 8. As shown in FIG. 1b, each drive magnet 16 produces magnetic flux $\phi$ which is directed toward the drive coil 8 in the direction parallel to the y-axis, as shown in FIG. 1b, so that the magnetic flux $\phi$ perpendicularly intersects the wire-like conductor of the drive coil 8, and is fed back to the drive magnet 16 via the inner and outer yokes 15a and 15b.

A spindle motor 18 (omitted in FIGS. 1d and 1e) imparts a torque to the recording medium 1 so as to rotate the same about the z-axis, the spindle motor 18 being fixedly mounted on the base B.

The movable optical system 100, the first wheel 9, the second wheel 10, the leaf spring 11, the spacer 12, the sliding member 6, the bobbin 7 and the drive coil 8 which make translational motion relative to the first guide shaft 13 will hereinafter be generally referred to as "movable portion". The component parts of the movable portion are arranged in such a manner that the overall center G of gravity of the movable portion is disposed on the axis of the first guide shaft 13 and is also disposed substantially at the center of the sliding member 6 in the x-axis direction.

As shown in FIG. 1e, one side of the mirror 5 is held in contact with the outer peripheral surface of the sliding member 6 which defines a reference line for the positioning of the mirror 5.

The operation of the optical recording and reproducing apparatus of the above construction will now be described.

First, when the movable portion is in a stationary condition, the sliding member 6 limits the motion of the movable portion only to a translational motion parallel to the axis of the first guide shaft 13 and to a rotational motion about the axis of the first guide shaft 13, and the first and second wheels 9 and 10 limit the rotational motion of the movable portion about the axis of the first guide shaft 13. Therefore, in this condition, the movable portion can only effect the translational motion in the direction parallel to the axis of the first guide shaft 13, that is, in the x-axis direction.

Next, when the movable portion is to be moved in the x-axis direction, the drive coil 8 is energized in such a manner that current flows through the drive coil 8 in a direction indicated by arrow I in FIG. 1a. As a result, because of electromagnetic forces and the magnetic flux $\phi$, a thrust Fa is produced in the positive direction of the x-axis as indicated in FIGS. 1b and 1c. Because of the symmetrical construction of the drive magnetic yoke 15, the symmetrical arrangement of the drive magnets 16 and the symmetrical arrangement of the drive coil 8 with respect to the sliding member 8, the line of action of the thrust Fa coincides with the axis of the first guide shaft 13. Since the drive coil 8 is rigidly connected to the movable optical system 100 via the bobbin 7 and the sliding member 6, the movable optical system 100 receives the force in the positive direction of the x-axis, and the sliding member 6 slides relative to the first guide shaft 13, and the movable optical system 100 begins accelerating motion as a result of the rolling movement of the first and second wheels 9 and 10 along the second guide shaft 14, so that the objective lens 2 is moved to the desired track on the recording medium 1. As shown in FIG. 1f, the laser beam 50 is reflected by the mirror 5, held by the mirror holder 4 of the movable optical system 100, and is directed toward the objective lens 2. The objective lens 2 is driven and controlled in the z-axis direction by the objective lens actuator 3, and the laser beam 50 is transmitted through the substrate 1a of the recording medium 1 to form a light spot on the recording surface 1b. The reflection beam, modulated in magnitude, phase, etc., depending on the information, is returned to the fixed optical system 17 via a reverse path, thereby reproducing the information. During the movement of the movable optical system 100, the address information of the recording medium 1 is always read so as to confirm the desired track. For recording the information, the laser light spot modulated by the information is applied onto the recording medium 1.

If the parallelism between the first and second guide shafts 13 and 14 is not precise, and even if their straightness and their cylindricity are not perfect, the movable portion slightly rotates about the first guide shaft 13, and the leaf spring 11 is elastically deformed, so that the first and second wheels 9 and 10 can be held in contact with the second guide shaft 14 in a stable manner, thereby achieving a stable movement of the movable portion.

When the movable portion makes the accelerating motion, an inertia force Fi passing through the center G of gravity is produced, and a force Fs of friction between the sliding member 6 and the first guide shaft 13 is produced at a substantially radially-central portion of the cross-section of the sliding member 6. However, the center G of gravity is disposed on the axis of the first guide shaft 13, and the line of action of the thrust Fa is also disposed on the first guide shaft 13. Thus, these forces Fa, Fi and Fs are all disposed on the axis of the first guide shaft 13, so that any moment is not produced. Further, due to the force applied to the second wheel 10 by the resilient restoring force of the leaf spring 1, reaction forces Ft and Fc are exerted on the first and second wheels 9 and 10, respectively. However, the rotation shafts of the first and second wheels 9 and 10 are parallel to each other, and the points of contact of the two wheels 9 and 10 with the second guide shaft 14 are disposed in the common plane perpendicular to the axis of the second guide shaft 14, and therefore the reaction forces Ft and Fc have respective vectors of the same magnitude acting in the opposite directions, respectively, so that these reaction forces completely cancel each other. Therefore, in this embodiment, the thrust Fa never produces any force contributing to the friction force exerted on the sliding member 6, and during the transit period such as the time of the abrupt acceleration of the movable portion, the movable portion can be moved in a stable manner.

Even if disturbance occurs, the inertia force produced in the movable portion is all received by the sliding member 6, since the center G of gravity of the movable portion lies in the axis of the first guide shaft 13, and therefore the leaf spring 11 will not be damaged.

Since the reference positioning line for the mirror 5 is defined by the outer peripheral surface of the sliding member 6, the parallelism in the x-axis direction is enhanced, and even when the movable portion is moved to any position, the optical characteristics with respect to the laser beam 50 can be kept highly precise.

As described above, in this embodiment, the center G of gravity of the movable portion, the line of action of the thrust, and the center of the slide member 6 are arranged on the axis of the first guide shaft 13. With this arrangement, any moment is not produced when the movable portion is accelerated. Further, the means for limiting the rotation of the movable portion about the first guide shaft comprises the two wheels having the respective rotation shafts parallel to each other. With this arrangement, the components of the rotation limiting force are not produced in the plane y-z, and therefore the friction force produced in the sliding member 6 can be kept to a minimum.

Since the sliding member 6 is used to connect the bobbin 7 to the movable optical system 100, the thrust can be transmitted to the movable optical system 100 without the use of any special structural member.

Further, since the positioning of the mirror 5 is effected by the sliding member 6, the optical stability can be enhanced.

A second embodiment of the present invention will now be described with reference to the drawings.

Figure 2A:
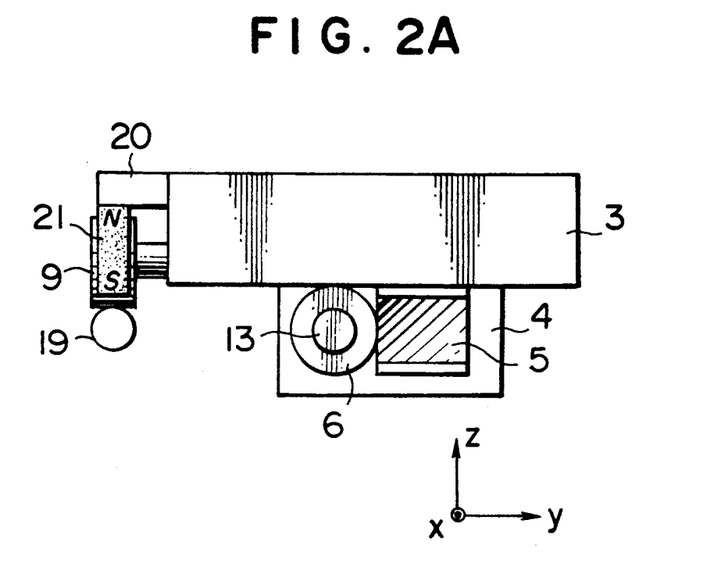
FIG. 2a is a front-elevational view of a rotation limiting means of an optical recording and reproducing apparatus according to a second embodiment of the invention.
Figure 2B:
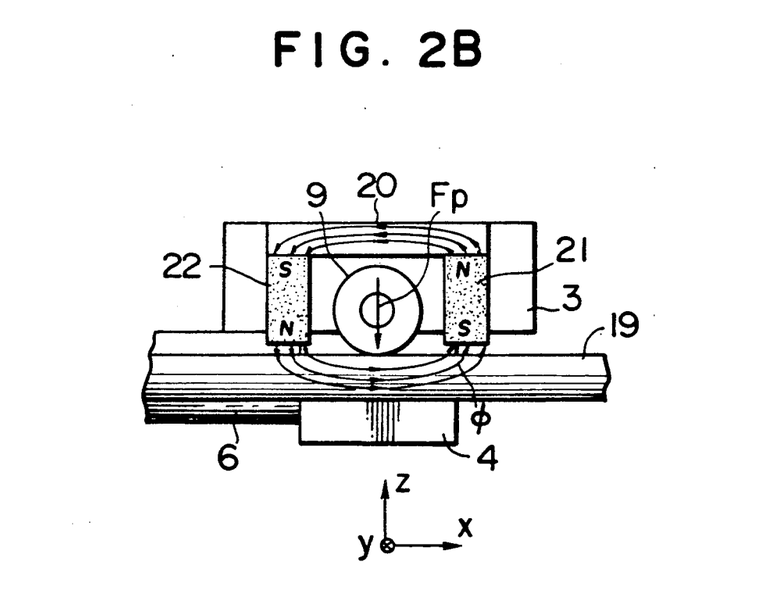

FIGS. 2a and 2b show a rotation limiting means in an optical recording and reproducing apparatus according to a second embodiment of the invention. x, y and z denote the directions of the coordinate axes, respectively. The like parts to those in FIG. 1a to 1F are designate by like reference numerals, FIG. 2a is a detailed front-elevational view of a portion of the apparatus, and FIG. 2b is a detailed right side-elevational view of a portion of the apparatus. The general construction of the optical recording and reproducing apparatus of this embodiment is the same as that of the first embodiment, and therefore explanation thereof is omitted, excepting the rotation limiting means is shown. In FIGS. 2a and 2b, an objective lens actuator 3, a mirror holder 4, a mirror 5, a sliding member 6, a first wheel 9 and a first guide shaft 13 are the same as those of the first embodiment, respectively. A magnetic guide shaft 19 is identical in mechanical shape to the second guide shaft 14 of the first embodiment, but differs therefrom in that the magnetic guide shaft 19 is made of a magnetic material. An attracting magnetic yoke 20 of a rectangular parallelepiped shape is fixedly mounted on the objective lens actuator 3, the attracting magnetic yoke 20 being made of a magnetic material. The attracting magnetic yoke 20 is symmetrical with respect to a plane which is parallel to a plane y-z and passes through the axis of rotation of the first wheel 9. A first attracting magnet 21 of a rectangular parallelepiped shape is magnetized in the positive direction of the z-axis, and is fixedly secured to the attracting magnetic yoke 20, with a small gap provided between the first attracting magnet 21 and the magnetic guide shaft 19. A second attracting magnet 22 is identical in mechanical shape to the first attracting magnet 21, but is magnetized in the negative direction of the z-axis. The second attracting magnet 22 is fixedly secured to the attracting magnetic yoke 20, and the first and second attracting magnets 21 and 22 are disposed symmetrically with respect to the plane which is parallel to the plane y-z and passes through the axis of rotation of the first wheel 9.

The rotation limiting means of the optical recording and reproducing apparatus in this embodiment will now be described.

A magnetic flux $\phi$ emerging from the second attracting magnet 22 passes through the gap and the magnetic guide shaft 19 and reaches the first attracting magnet 21, so that a magnetic attracting force is produced between each of the first and second attracting magnets 21 and 22 and the magnetic guide shaft 19. Since the first and second attracting magnets 21 and 22 are connected to the first wheel 9 via the attracting magnetic yoke 20 and the objective lens actuator 3, there is produced a force Fp urging the first wheel 9 against the magnetic guide shaft 19. Then, the magnetic flux $\phi$ flows from the first attracting magnet 21 to the second attracting magnet 22 via the attracting magnetic yoke 20. By reducing the gap between the magnetic guide shaft 19 and each of the first and second attracting magnets 21 and 22, the value of the force Fp can be increased sufficiently to always keep the first wheel 9 in contact with the magnetic guide shaft 19. Therefore, even if the movement of the movable portion is in any condition, the rotation limiting means can always achieve its purpose in a stable manner.

In this embodiment, effects similar to those of the first embodiment can be achieved, and since the second wheel 10 and the spacer 12 are not required, the weight and the cost can be further reduced. Further, the stability can be expected for a long period of time since the rotation limiting means does not entirely depends for its operation on a mechanical structure.

A third embodiment of the present invention will now be described with reference to the drawings.

Figure 3A:
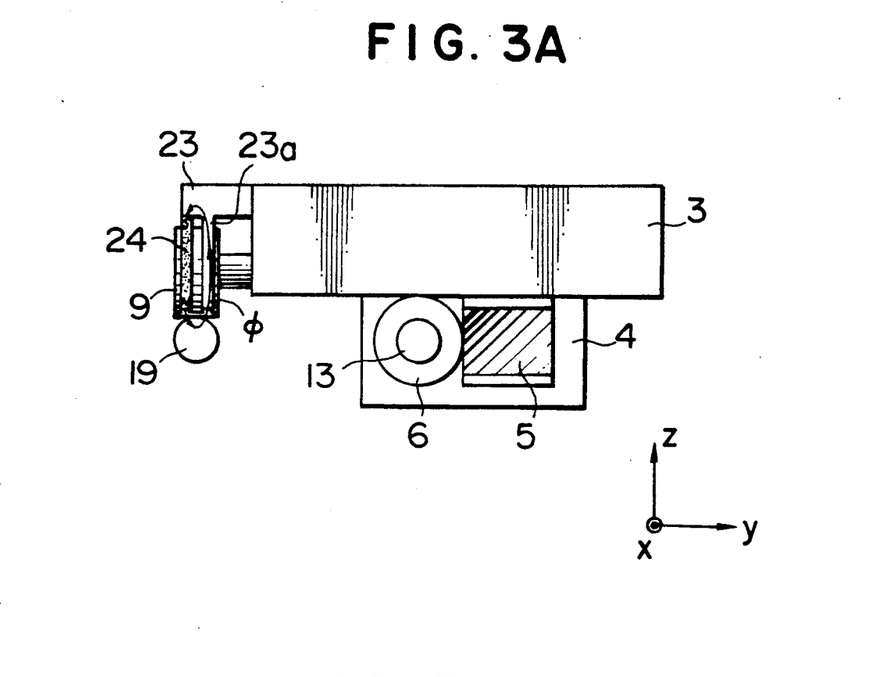
FIG. 3a is a front-elevational view of a rotation limiting means of an optical recording and reproducing apparatus according to a third embodiment of the invention.
Figure 3B:
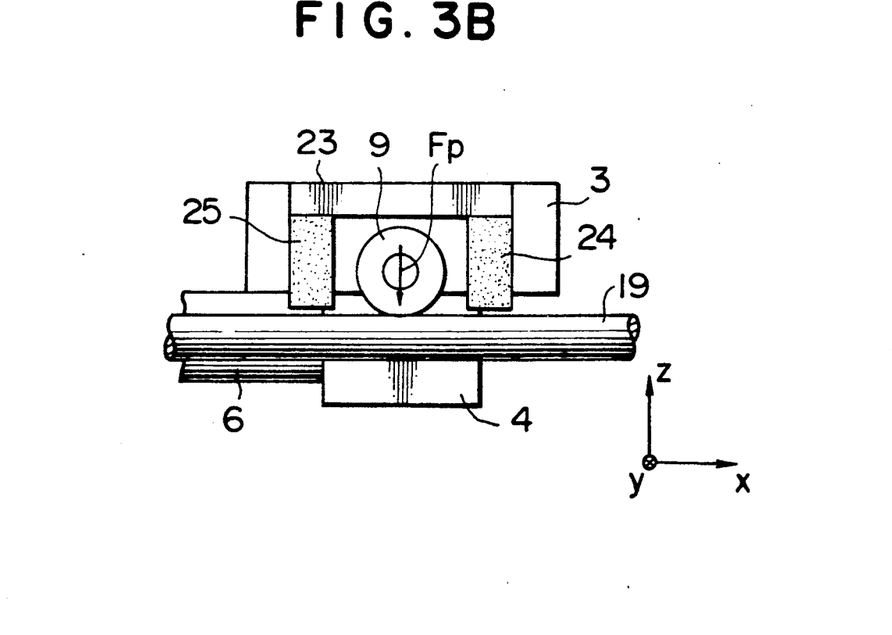

FIGS. 3a and 3b show a rotation limiting means of an optical recording and reproducing apparatus according to the third embodiment. x, y and z denote the directions of the coordinate axes, respectively. The like parts to those in FIGS. 1a to 1f are designated by like reference numerals. FIG. 3a is a detailed front-elevational view of a portion of the device, and FIG. 3b is a detailed right side-elevational view of a portion of the device.

The general construction of the optical recording and reproducing apparatus in this embodiment is the same as that of the first embodiment, and therefore the explanation thereof is omitted, excepting the rotation limiting means. In FIGS. 3a and 3b, an objective lens actuator 3, a mirror holder 4, a mirror 5, a sliding member 6, a first wheel 9 and a first guide shaft 13 are the same as those of the first embodiment, respectively. A magnetic guide shaft 19 is identical to that of the second embodiment. An attracting magnetic yoke 23 is fixedly mounted on the objective lens actuator 3, and is made of a magnetic material. The attracting magnetic yoke 23 is symmetrical with respect to a plane which is parallel to a plane y-z and passes through the axis of rotation of the first wheel 9. A first attracting magnet 24 of a rectangular parallelepiped shape is magnetized in the negative direction of the z-axis, and is fixedly secured to the attracting magnetic yoke 23, with a small gap provided between the first attracting magnet 24 and the magnetic guide shaft 19. A second attracting magnet 25 is identical in mechanical shape and indirection of magnetization to the first attracting magnet 24, and is fixedly secured to the attracting magnetic yoke 23. The first and second attracting magnets 24 and 25 are disposed symmetrically with respect to the plane which is parallel to the plane y-z and passes through the axis of rotation of the first wheel 9. The attracting magnetic yoke 23 has a pair of yoke portions 23a which are respectively opposed to and spaced slightly from the first and second attracting magnets 24 and 25 in the direction of the y-axis.

The operation of the rotation limiting means of the optical recording and reproducing apparatus of this embodiment will now be described.

As shown in FIG. 3a, a magnetic flux $\phi$ emerging from the first attracting magnet 24 passes through the gap, the magnetic guide shaft 29 and the yoke portion 23a. The magnetic flux $\phi$ further passes through the attracting magnetic yoke 23 and reaches the first attracting magnet 24. A similar phenomenon occurs with respect to the second attracting magnet 25. Therefore, a magnetic attracting force is produced between the magnetic guide shaft 19 and each of the first and second attracting magnets 24 and 25, and there is produced a force Fp urging the first wheel 9 against the magnetic guide shaft 19, as in the second embodiment. By reducing the gap between the magnetic guide shaft 19 and each of the first and second attracting magnets 24 and 25, the value of the force Fp can be increased sufficiently to always keep the first wheel 9 in contact with the magnetic guide shaft 19. Therefore, even if the movement of the movable portion is in any condition, the rotation limiting means can always achieve its purpose in a stable manner.

In this embodiment, although effects similar to those of the second embodiment are achieved, the paths of flow of the magnetic flux are disposed substantially only in planes parallel to the plane y-z, with no component existing in the x-axis direction, and therefore leakage of the magnetic flux to the first wheel 9 is reduced. Generally, in view of durability, precision, cost and etc., a radial bearing or the like is, in many cases, used as the first wheel. Steel balls and retainers of such a bearing are made of a magnetic material, and therefore when the magnetic flux passes through the bearing, a magnetic attractive force is produced between the steel balls and the retainers with the result that a rotational resistance due to the friction between the two is produced.

In this embodiment, such a problem is not encountered, and an inexpensive radial bearing of the ordinary type can be used as the first wheel 9. Therefore, the cost can be further reduced, and the intended reliability of the radial bearing can be maintained.

A fourth embodiment of the present invention will now be described with reference to the drawings.

Figure 4:
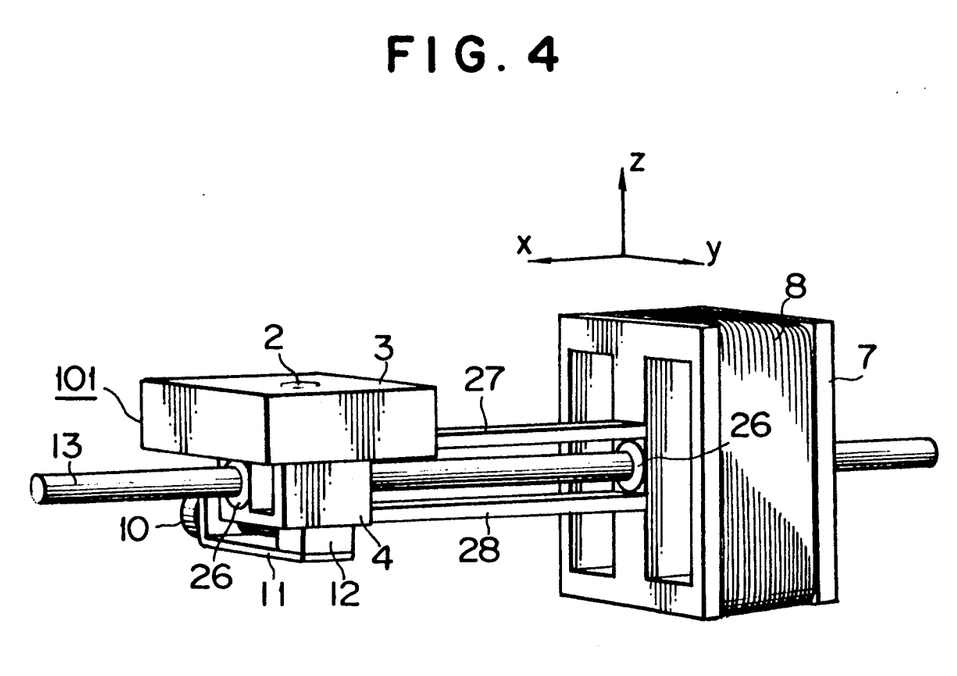
FIG. 4 is a perspective view of a movable portion of an optical recording and reproducing apparatus according to a fourth embodiment of the invention.

FIG. 4 is a perspective view of a movable portion of an optical recording and reproducing apparatus according to the fourth embodiment. x, y and z denote the directions of the coordinate axes, respectively. The general construction of the optical recording and reproducing apparatus in this embodiment is the same as that of the first embodiment, and therefore explanation thereof is omitted, excepting the movable portion and a first guide shaft 13. In FIG. 4, an objective lens 2, an objective lens actuator 3, a mirror holder 4, a mirror 5 (not shown), a bobbin 7, a drive coil 8, a first wheel 9 (not shown), a second wheel 10, a leaf spring 11, a spacer 12 and the first guide shaft 13 are the same as those of the first embodiment, respectively. Sliding members 26 are identical to the sliding member 6 of the first embodiment except that the number of the sliding members 26 as well as the length thereof in the direction of the x-axis is different. The two sliding members 26 are press-fitted respectively in the mirror holder 4 and the bobbin 7 which are provided respectively at the opposite ends of the movable portion. The objective lens 2, the objective lens actuator 3, the mirror holder 4 and the mirror 5 in combination constitute a movable optical system 101. A first connecting member 27 of a rectangular parallel-epiped shape extends longitudinally in the direction of the x-axis. One end of the first connecting member 27 is rigidly connected to the objective lens actuator 3, and the other end thereof is rigidly connected to the bobbin 7. Like the first connecting member 27, a second connecting member 28 of a rectangular parallelepiped shape extends longitudinally in the direction of the x-axis. One end of the second connecting member 28 is rigidly connected to the mirror holder 4, and the other end thereof is rigidly connected to the bobbin 7. The first and second connecting members 27 and 28 in combination constitute means for limiting the movement of the movable optical system 101 relative to the bobbin 7.

The operation of this embodiment is the same as that of the first embodiment, and therefore explanation thereof is omitted. The advantage of this embodiment is that because the sliding members 26 are spaced apart and disposed respectively at the opposite ends of the movable portion, the areas of contact of the sliding members 26 with the first guide shaft 13 are reduced to thereby reduce the friction therebetween, so that the movable portion can be moved at a higher speed. Another advantage is that because the sliding members 26 requiring relatively high precision are short, an easier manufacture and a cost reduction can be achieved.

In this embodiment, the sliding member structure is divided into two, and therefore in order to achieve a smooth sliding movement of the sliding members relative to the first guide shaft 13, it is necessary to adjust the concentricity and inclination with respect to the two sliding members when assembling the movable portion. The following method is effective for achieving this. Namely, there is provided a jig shaft of a diameter smaller than the inner diameter of the sliding member 26 and greater than the outer diameter of first guide shaft 13. This jig shaft is inserted into the two sliding members 26 to adjust the concentricity and inclination with respect to the two sliding members 26, and in this condition the sliding members 26 are fixedly mounted in place by press-fitting, adhesive-bonding or the like. Then, the jig shaft is removed from the sliding members 26, and the first guide shaft 13 is inserted through the sliding members 26. Generally, there is a clearance of about 10 μm between the sliding member 26 and the first guide shaft 13, and therefore if the outer diameter of the jig shaft is greater by about 5 μm than the outer diameter of the first guide shaft 13, then the jig shaft can be inserted into the sliding member 26 with a clearance of about 5 μm therebetween. Such dimensional accuracy can be easily achieved by machining. Even if the two sliding shafts 26 are inclined with respect to each other, or are not accurately concentric with respect to each other with such a result that the clearance between the jig shaft and the sliding member becomes zero, the first guide shaft 13 can be positively inserted through the sliding member 26, fixedly mounted in place, with a clearance with 5 μm, thus easily providing a smooth sliding structure.

In the first to fourth embodiments, although the sliding structure is achieved by the lubricating resin or the like coated on the inner surface of the sliding member 6 or 26, this lubricating coating resin may be omitted, in which case similar effects can still be achieved since a lubricating resin or the like is coated on the outer surface of the first guide shaft 13. In this case, the coated resin which is difficult to have a desired precision is subjected to an external surface processing, and therefore the required precision can be obtained more easily as compared with an internal surface processing. This also reduces the cost.

In the first to fourth embodiments, although the area of contact between the sliding member 6 or 26 and the first guide shaft 13 constitutes the sliding structure, this sliding structure may be replaced by a rolling structure using a linear stroke bearing or the like. In this case, the friction force is further reduced, and the movable portion can be moved at a higher speed, and therefore such a structure is suited for an optical recording and reproducing apparatus of a higher-speed type.

Further, in the first to fourth embodiments, although the movable portion includes the objective lens actuator 3 for driving the objective lens in the direction of the z-axis, the position of the objective lens may be devised to the movable portion, and a laser beam angle range-control means may be provided in the fixed optical system 17 for controlling the size of the light spot formed on the recording surface 1b of the recording medium 1. In this case, the movable optical system 100, 101 only comprises the objective lens 2, the mirror 5 and the mirror holder 4, and the weight of the movable portion can be reduced greatly.

Further, the present invention is not restricted to the above embodiments, and various modifications can be made. Within the scope of the present invention which is limited only by the attendant claims.

What is claimed is:

1. An optical recording and reproducing apparatus comprising:
a movable portion having a gravitation center and including a movable optical system including an objective lens for focusing a light beam onto a recording surface of a disk-shaped recording medium;
drive means for applying to said movable portion a thrust acting substantially in a radial direction of said disk-shaped recording medium;
a base;
a guide shaft fixedly mounted on said base, having a center axis and extending in a direction parallel to the direction of said thrust;
said movable portion including a guide means for supporting said movable portion such that said movable portion is movable in the direction of said center axis of said guide shaft and is rotatable about said center axis, said guide means having a contact surface zone making contact with said guide shaft, a center of said contract surface zone being disposed in the vicinity of said center axis of said guide shaft; and
rotation limiting means for limiting the rotation of said movable portion relative to said guide shaft about the center axis of said guide shaft;
the movable portion being moved by said drive means relative to said guide shaft substantially in the radial direction of said disk shaped recording medium, the gravitational center of said movable portion being disposed in the vicinity of the center axis of said guide shaft;
wherein said rotation limiting means comprises at least one rolling member mounted on said movable portion and having an axis of rotation perpendicular to the direction of movement of said movable portion, a cylindrical auxiliary guide shaft disposed substantially parallel to said guide shaft, and urging means urging said rolling member against said auxiliary guide shaft; and
wherein said urging means further comprises an auxiliary rolling member, and an elastic member through which said auxiliary rolling member is mounted on said movable portion, said auxiliary rolling member having an axis of rotation parallel to the axis of rotation of said rolling member, said urging means urging said auxiliary rolling member against said auxiliary guide shaft under a first urging force resulting from an elastic restoring force of said elastic member while said urging means urges said rolling member against said auxiliary guide shaft under a second urging force resulting from a reaction of the contact between said auxiliary rolling member and said auxiliary guide shaft, and said first and second urging forces respectively having vectors disposed substantially on a common line.

2. An apparatus according to claim 1, wherein a section of said movable portion to which said thrust is applied by said drive means is connected to said movable optical system by an annular sliding member slidably fitted on said guide shaft in a generally concentric relation thereto.

3. An apparatus according to claim 1, wherein the center of gravity of said movable portion is positioned in an area interposed between two planes which pass respectively through the opposite ends of said contact surface zone spaced from each other axially of said guide shaft and which are perpendicular to the axis of said guide shaft.

4. An apparatus accordign to claim 1, wherein said movable optical system includes deflection means for deflecting a light beam of parallel rays, emitted in a substantially parallel relation to said recording surface of said disk-shaped recording medium, into a direction substantially perpendicular to said recording surface, said deflecting means being positioned by contactign a part of said deflection means with a part of said guide means.

5. An optical recording and reproducing apparatus comprising:
a movable portion having a gravitational center and including a movable optical system including an objective lens for focusing a light beam onto a recording surface of a disk-shaped recording medium;
drive means for applying to said movable portion a thrust acting substantially in a radial direction of said disk-shaped recordign medium;
a base;
a guide shaft fixedly mounted on said base, having a center axis and extending in a direction parallel to the direction of said thrust;
asid movable portion including a guide means for supporting said movable portion such that said movable portion is movable in the direction of said center axis of said guide shaft and rotatable around said center axis, said guide means having a contact surface zone making contact with said guide shaft, a center of said contact surface zone being disposed in the vicinity of the center axis of said guide shaft; and
rotation limiting means for limiting the rotation of said movable portion relative to said guide shaft about the center axis of said guide shaft;
the movable portion eing moved by said drive means relative to said guide shaft substantially in the radial direction of said disk-shaped recording medium, the gravitational center of said movable portion being disposed in the vicinity of the center axis of said guide shaft, said drive means applying said thrust such that a moment produced by said thrust and acting around the gravitation center of said movable portion is rendered to substantially zero;
wherein said rotation limiting means comprises at least one rolling member mounted on said movable portion and having an axis of rotation perpendicular to the direction of movement of said movable portion, a cylindrical auxiliary guide shaft disposed substantially parallel to said guide shaft, and urging means urging said rolling member against said auxiliary guide shaft; and
wherein said urging means is mounted on said movable portion through an elastic member, said urging means including an axuiliary rolling member having an axis of rotation parallel to the axis of rotation of said rolling member, said auxiliary rolling member being urged against said auxiliary guide shaft under a first urging force resulting from an elastic restoring force of said elastic member, while urging said rolling member is urged against said auxiliary guide shaft under a second urging force resulting from a reaction of contact between said auxiliary rolling member and said auxiliary guide shaft, and said first and second urging forces having vectors disposed substantially on a common line.

6. An apparatus according to claim 5, wherein a section of said movable portion to which said thrust is applied by said drive means is connected to said movable optical system by an annular sliding member slidably fitted on said guide shaft is generally concentric relation thereto.

7. An apparatus according to claim 5, wherein the center of gravity of said movable portion is disposed at an area interposed between two planes which pass respectively through the opposite ends of said contact surface zone spaced from each other axially of said guide shaft and which are perpendicular to the axis of said guide shaft.

8. An apparatus according to claim 5, wherein said movable optical system includes deflection means for deflecting a light beam of parallel rays, emitted in substantially parallel relation to said recording surface of said disc-shaped recording medium, into a direction substantially perpendicular to said recording surface, said deflecting means being positioned by contacting a part of said deflection means with a part of said guide means.

* * * * *